United States Patent [19]

Grönebaum

[11] 4,216,049

[45] Aug. 5, 1980

[54] APPARATUS FOR ASSEMBLING STRIPS OF VENEER

[75] Inventor: Theodor A. Grönebaum, Rietberg, Fed. Rep. of Germany

[73] Assignee: Firma Heinrich Kuper, Fed. Rep. of Germany

[21] Appl. No.: 888,287

[22] Filed: Mar. 20, 1978

[30] Foreign Application Priority Data

Mar. 26, 1977 [DE] Fed. Rep. of Germany ....... 2713522

[51] Int. Cl.² ........................ B32B 31/12; B27M 1/08; B32B 5/08; B65H 54/00

[52] U.S. Cl. ................................ 156/433; 144/309 Q; 156/166; 156/179; 156/291; 156/538; 156/544; 156/304.3; 428/195; 428/196

[58] Field of Search .................... 144/309 Q; 156/166, 156/178, 179, 244.11, 291, 433, 500, 304, 548, 538, 544; 428/195, 537, 196

[56] References Cited

U.S. PATENT DOCUMENTS

| | | | |
|---|---|---|---|
| 3,326,736 | 6/1967 | Ortel | 156/297 |
| 3,377,223 | 4/1968 | Clausen et al. | 156/166 |
| 3,445,313 | 5/1969 | Clausen et al. | 156/433 |
| 3,490,974 | 1/1970 | Jacobson | 156/304 X |
| 3,547,735 | 12/1970 | Ortel | 156/440 |
| 3,579,405 | 5/1971 | Crawford | 156/304 X |
| 3,660,206 | 5/1972 | Ortel | 156/545 |
| 3,669,804 | 6/1972 | Clausen et al. | 156/176 X |
| 3,686,057 | 8/1972 | Ortel | 156/548 |
| 3,705,829 | 12/1972 | Brenneman et al. | 156/178 X |
| 3,849,222 | 11/1974 | Ortel | 156/291 X |

*Primary Examiner*—William A. Powell
*Assistant Examiner*—Robert A. Dawson
*Attorney, Agent, or Firm*—Steinberg & Blake

[57] ABSTRACT

The present invention relates to an apparatus for assembling veneer strips by applying adhesive threads to the upper and lower surfaces of the strips of veneer, by means of a plurality of thread supplying and alternating devices located in spaced juxtaposition. The invention is characterized in that each thread supplying and alternating device comprises two circular segment bodies which are rotatably mounted on a frame of the apparatus. The circular segment bodies are adapted to be driven by a common driving device, and on each circular segment body a thread guide is located. The circular segment bodies are so arranged and formed that an adjustable free passage for the workpiece to be treated is provided.

14 Claims, 10 Drawing Figures

Fig.3
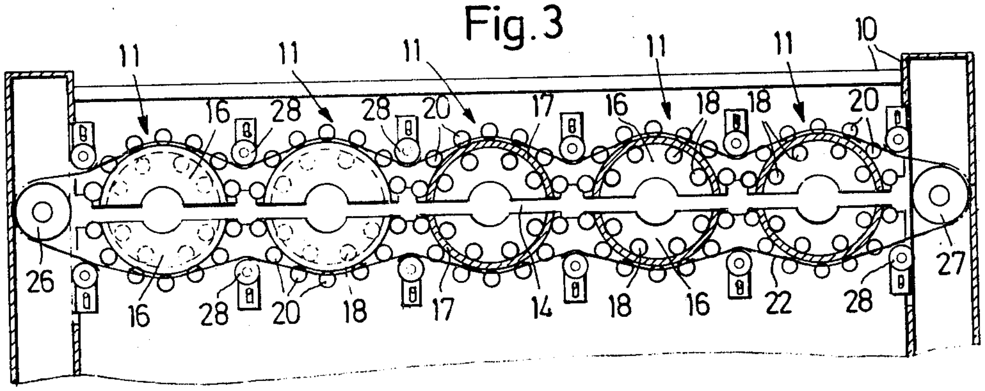
Fig.4
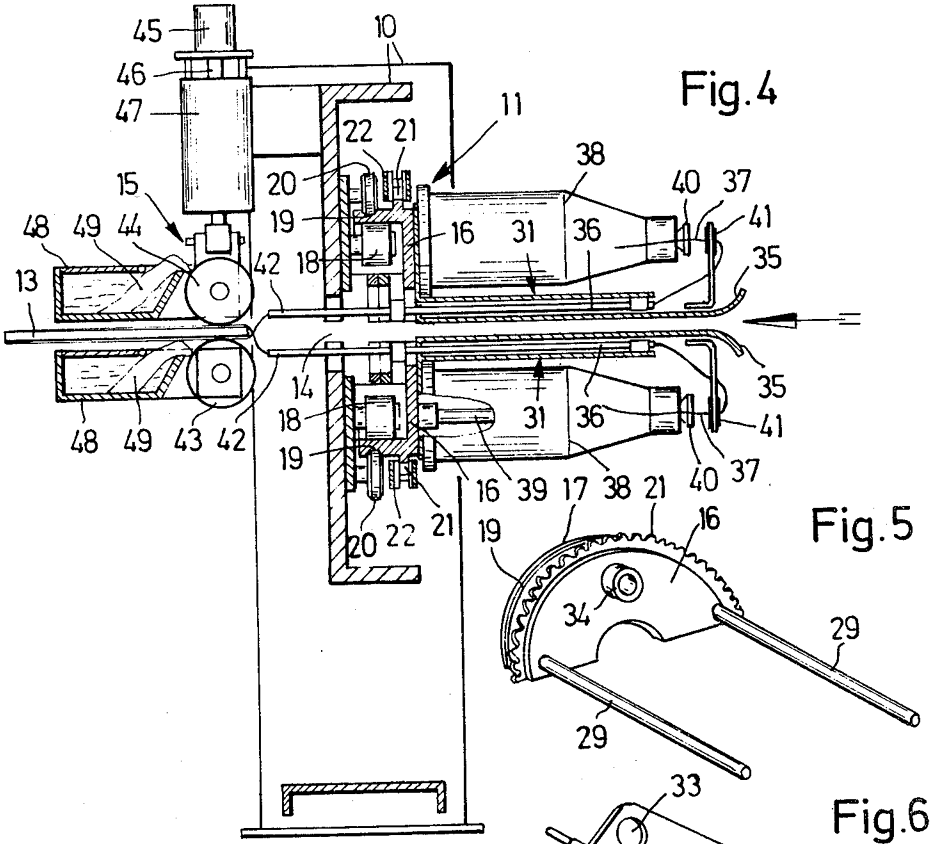
Fig.5
Fig.6
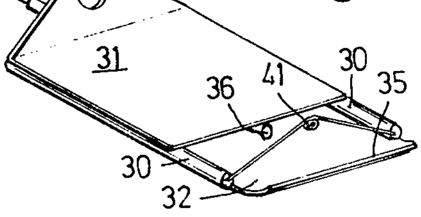

APPARATUS FOR ASSEMBLING STRIPS OF VENEER

BACKGROUND OF THE INVENTION

The present invention relates to an apparatus for assembling veneer strips by applying adhesive threads to the upper and lower surfaces of said veneer strips, having a workpiece feeding device and a plurality of thread supplying and alternating devices located in spaced juxtaposition each having two thread guides for the adhesive threads on both surfaces of the veneer strips, whereby the thread guides, by intersecting the movement plane of the veneer strips to the other side are located progressively or reversibly displaceable, so that the adhesive threads supplied alternately assume a position on one side and then on the other side of the veneer strips, and having a heating device for the adhesive threads and a device for pressing the adhesive threads against the surfaces of the veneer strips located behind each thread supplying and alternating device, in the direction of passage of the veneer strips.

Such a device for assembling veneer strips is already known from German Auslegeschrift No. 1 628 989 (corresponding U.S. Pat. No. 3,686,057). In this apparatus, the thread supplying and alternating devices are located both in the centre and at both edges of the apparatus. The thread supplying and alternating devices at the edges are thus constructionally identical but different to that of the thread supplying and alternating device in the centre. The thread guides of such known apparatus each extend substantially in the longitudinal direction of the veneer strips, so that the thread supplying and alternating device assumes a substantial proportion of the length of the veneer strip. The thread spools of the known apparatus are located partly at the edge of the apparatus and are very remote from the point where they are to be brought into contact with the veneer strips. The disadvantage of such an arrangement is that the thread to be payed out has to be protected by special measures so as to prevent any operational breakdowns during unwinding of the adhesive threads caused by movement cycles on the site of erection of the device.

SUMMARY OF THE INVENTION

The object of the invention is to provide a reliably operating apparatus for assembling veneer strips having an increased number of adhesion positions over the length of the veneer strips and, as compared with known apparatus, is simpler in overall structure.

According to the present invention there is provided an apparatus for assembling strips of veneer by adhesion of adhesive threads to the upper and lower surface of said strips of veneer, comprising a workpiece feed device and a plurality of thread supplying and alternating devices located in spaced juxtaposition, each having two thread guides for the adhesive threads on both sides of said strips of veneer, whereby said thread guides, by intersecting the movement plane of the strips of veneer to the other side, are located so as to be progressively or reversibly displaceable, so that the adhesive threads supplied alternately assume a position on one side and then on the other side of said strip of veneer, and having a heating device for the adhesive threads and a device for pressing the adhesive threads against the surfaces of said strips of veneer located behind each said thread supplying and alternating device in the direction of passage of said strips of veneer, wherein each thread supplying and alternating device comprises two circular segment bodies assembled in a circle and rotatably mounted on a frame of the apparatus, which circular segment bodies are adapted to be driven by a common driving device about their horizontally extending axis of rotation, and extending in the plane of movement and direction of said strips of veneer, whereby on each circular segment body, a thread guide is located and said circular segment bodies being so arranged and formed that a free passage for the workpiece is formed which is adjustable over the whole width of the apparatus.

The feeding device preferably comprises several identical feed units which are located each between juxtaposed thread supplying and alternating devices. The circular segment bodies preferably contain a cylindrical jacket part which is supported on its inner surface by cylindrical rollers which are secured to the frame with a horizontal axis. The jacket part preferably contains on its outer surface an annular groove in which cylindrical rollers secured to the frame engage.

The driving device for the segment bodies preferably contains a conveyor chain which engages in the gear rings located on the circumference of the circular segment body. The conveyor chain is preferably drivable by a sprocket wheel mounted on the frame. Each circular segment body may also be drivable by its own conveyor chain which is connected via bevel gears with the driving shaft. Each circular segment body may alternatively be drivable by pinions engaging in its gear ring. Each two assembled circular segment bodies are drivable by means of a common racked bar engaging in the gear rings.

Each circular segment body preferably has an angle part mounted thereon to which the thread guide is secured. The angle part preferably contains a guide surface having a curved inlet end for the veneer strips.

It is preferable for a thread spool to be mountable on the angle part whereby the axis of the thread spool extends parallel with the direction of movement of the veneer strips. A thread eyelet is preferably secured on the angle part on the axle of the thread spool.

The thread guide is preferably formed as a tube which is provided with a heating device.

BRIEF DESCRIPTION OF THE DRAWINGS

FIG. 3 is a schematic view of the connection of a plurality of identically formed thread supplying and alternating devices with a driving conveyor chain;

FIG. 4 is a section through a thread supplying and alternating device in the direction of movement of said veneer strips;

FIG. 5 is a circular segment body in accordance with the invention;

FIG. 6 is an angle part which is mounted on said circular segment body;

DESCRIPTION OF THE PREFERRED EMBODIMENTS

Figure 1:
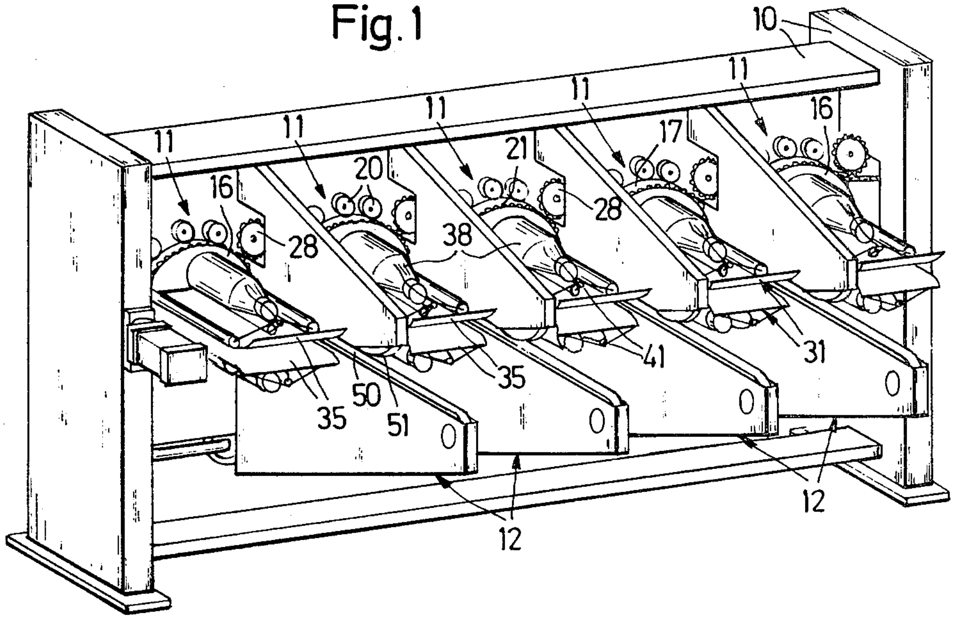
FIG. 1 is a perspective view of an apparatus in accordance with the invention from the supply side of said veneer strips.
Figure 2:
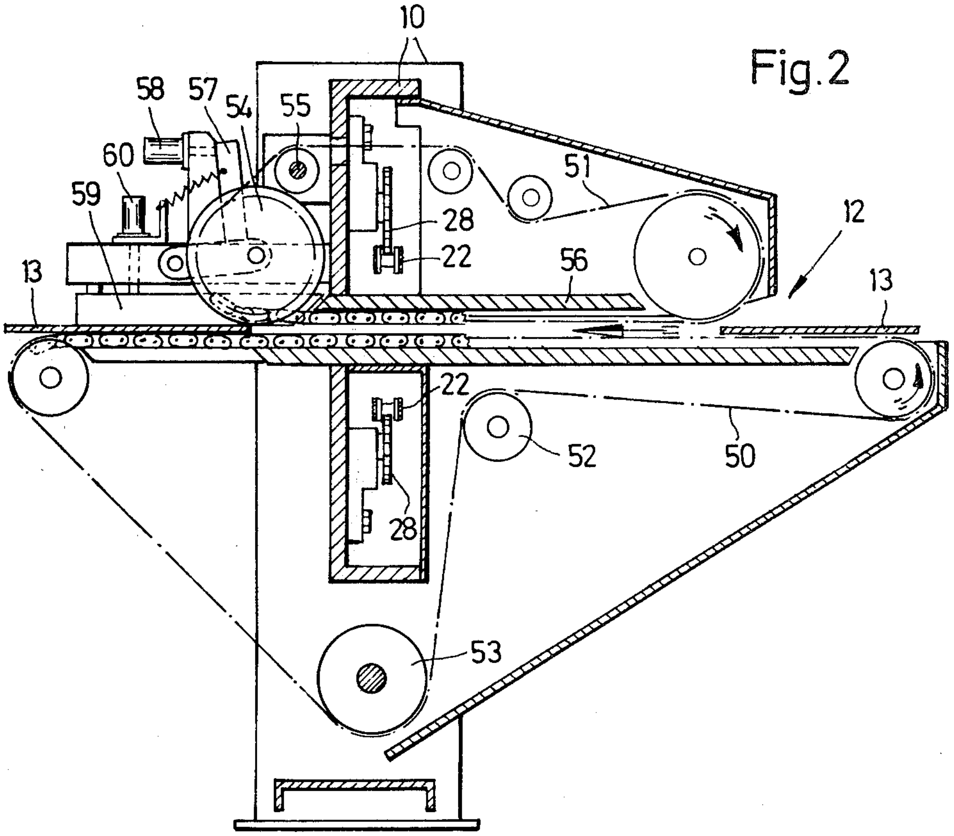
FIG. 2 is a cross-sectional view through the apparatus at the point of a feed unit.
Figure 7:
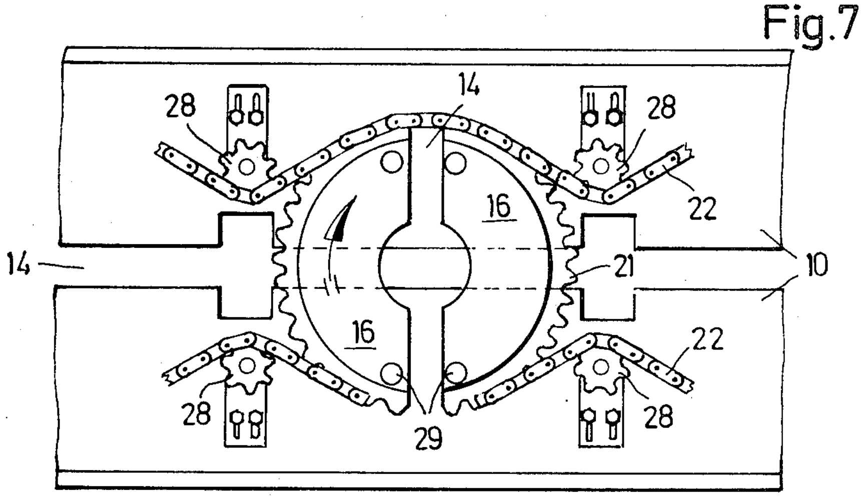
FIG. 7 is a schematic view of the drive of a thread supplying and alternating device by means of a conveyor chain.
Figure 8:
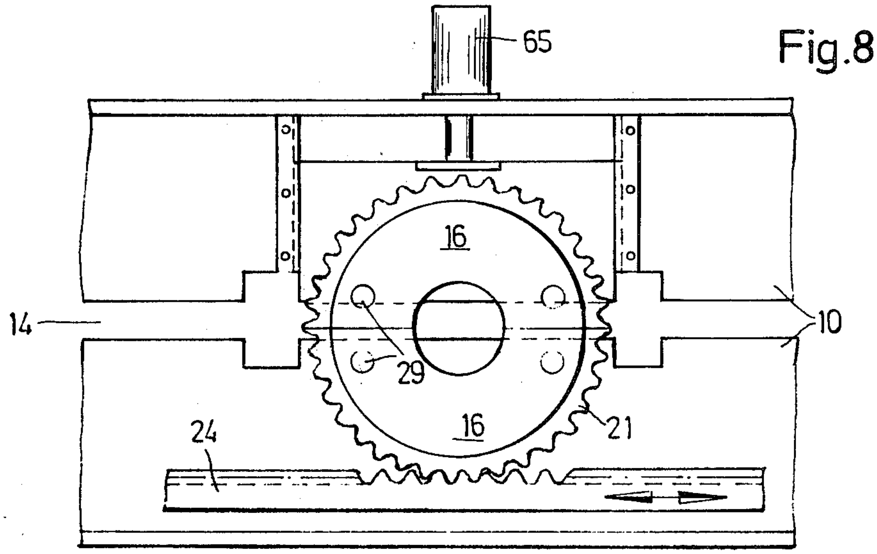
FIG. 8 is a schematic view of the drive of a thread supplying and alternating device having a racked bar.
Figure 9:
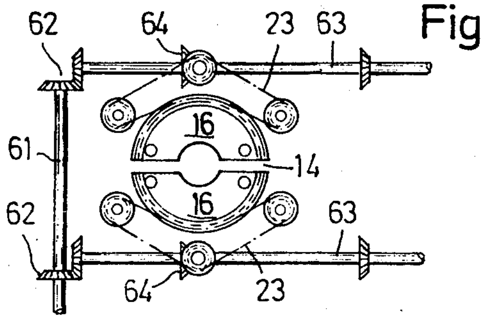
FIG. 9 is a schematic view of the drive of a thread supplying and alternating device with two separate conveyor chains.
Figure 10:
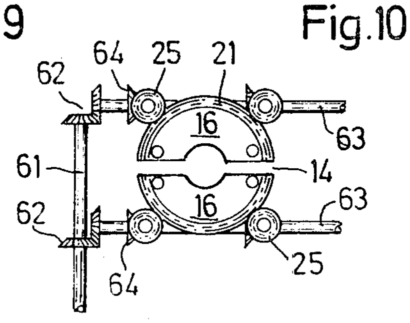
FIG. 10 is a schematic view of the drive of a thread supplying and alternating device having several pinions.

The apparatus in accordance with the invention for assembling veneer strips has a frame 10 on which five identically formed thread supplying and alternating devices 11 are secured. Between each two thread supplying and alternating devices 11 there is a feed unit 12 of a feeding device for the conveying of veneer strips 13 during processing. At the beginning of the processing, the apparatus for assembly of said veneer strips also has a level horizontal gap 14 to receive said veneer strip 13. Said strip, with its cross direction extending at right angles to the direction of grain, is inserted with its longitudinal edge into the gap 14 and is connected to the preceding veneer strip 13. In the direction of operation behind the thread supplying and alternating devices 11 and the feed units 12 at the outlet of the gap 14, a device 15 is provided for pressing adhesive threads against the surface of the veneer strips 13 which device is also secured to the frame 10.

Each thread supplying and alternating device 11 consists of two semi-circular segment bodies 16 which are so assembled that they form a circular surface and whereby between them a gap 14 is formed. For mounting, the circular segment bodies 16 each have cylindrical jacket parts 17. The inside surface of the cylindrical jacket part 17 of each circular segment body 16 is supported on cylindrical rollers 18, whilst a circular groove 19 is formed in the outer surface of the cylindrical jacket part 17, in which groove cylindrical rollers 20, which are secured to the frame 10, engage. All the cylindrical rollers 18 and 20 are mounted on horizontal shafts which are secured to the frame 10. Thus, the axes of the cylindrical rollers 18 are all located on an internal circle, whilst the axes of the cylindrical rollers 20 are all located on an external circle on the frame 10. Each circular segment body 16 may also execute a rotary movement with its cylindrical jacket part 17 between the cylindrical rollers 18 and 20. For the purpose of driving to execute such rotary movement, the circular segment body 16, on the outer circumference of its cylindrical jacket part 17, is provided with a gear ring 21 in which the links of a conveyor chain 22 or 23 engage. The conveying may also be effected by means of a racked bar 24 and pinions 25.

The arrangement for conveying, for example the conveyor chain 22, ensures a simultaneous movement of all circular segment bodies 16. The conveyor chain 22 is retained on the frame 10 in sprockets 26 and 27 which are adapted as gears. To ensure that the conveyor chain 22 encloses each circular segment body 16 with the required angle of wrap, the apparatus has several pairs of sprockets 28 which tension the conveyor chain 22 between each two thread supplying and alternating devices 11.

Each circular segment body 16 has secured thereto guide rods 29 projecting at right angles relative to the circular surface, on which rods guide tubes 30 of an angle part 31 may be mounted. The angle part 31 consists of two metal sheets or plates arranged in parallel, one of which serves as a guide surface 32 for the veneer strips 13. The upper plate is bent at right angles and has a bore 33 formed therein to receive a cam 34 projecting from the circular segment body 16. The lower plate, acting as guide surface 32, has a curved inlet end 35 to facilitate the insertion of the veneer strip 13 into the gap 14. The guide tubes 30 are located between the two plates at the edge and with their axes extending in the direction of movement of the veneer strips 13. A tube, which acts as thread guide 36 for the adhesive thread 37, extends parallel thereto between the plates.

The angle part 31, mounted on the circular segment body 16 with its plate bent at right angles, provides a space for the reception of a thread spool 38. The latter is mounted with its axis parallel to the thread guide 36 on the angle part 31 and secured by means of a drawbar 39 engaging in the cam 34. The connection of the drawbar 39 with the cam 34 may be a bayonet closure. The drawbar 39 is inserted axially through the thread spool 38. The end of the drawbar remote from the cam 34 has a conical head 40 which ensures a close abutment of the thread spool 38 against the bent over plate of the angle part 31, and an abutment of the angle part 31 against the circular segment body 16.

Unwinding of the thread spool 38 occurs from the outer surface. The adhesive thread 37, which is conventional and constitutes a thread provided with a heat actuated adhesive agent as is well known in the art, thus first moves in an opposite direction relative to the direction of movement of the veneer strip up to a thread eye 41 secured in front of the thread spool 38 on the angle part. From there the adhesive thread 37 is conducted to the inlet end of the thread guide 36 through to the outlet end 42. The thread guide is provided with a heating means with which the adhesive thread may be electrically heated. Due to the heating the adhesive on the surface of the adhesive thread 37 is activated.

The device 15, for pressing the adhesive thread in position appertaining to each thread supplying and alternating device 11, is arranged in such a manner behind the thread supplying and alternating device 11 that between two rollers it leaves a gap exposed which is located in extension of the gap 14. The lower roller 43 is securely mounted, whilst the upper roller 44 thereabove is vertically displaceable. By means of a hydraulic cylinder 45, the connecting rod 46 of which is guided in a guide part 47, the upper roller 44 may be pressed against the veneer strips 13 located between it and the lower roller 43 and the adhesive threads 37 attached thereto. The hydraulic cylinder 45 may also be replaced by a pressure medium cylinder, for example, a pneumatic cylinder.

The arrangement 15 also contains two troughs 48 in which a separating means for the adhesive of the adhesive threads 37 is located. This separating means is conducted to the surface of the rollers 43 and 44 by means of two sponges 49, so that after the roller surfaces have been pressed against the adhesive threads 37 adhesive cannot be deposited on the outer surfaces of the rollers.

The rollers 43 and 44 are compelled to rotate due to the movement of the veneer strips 13. The arrangement 15 may also have its own drive if the dimensions of the workpieces necessitate it. In the plane in front of the inlet region of the rollers 43 and 44, there is a control device which cooperates with the drive of the apparatus for assembling veneer strips. This control device may be adapted as a light source with a photoelectric cell and light barrier located therebetween.

The feed units 12 of the feeding device mounted besides the thread supplying and alternating devices 11 on the frame 10 are comprised of two driven conveyor chains 50 and 51. The lower conveyor chain 50 is retained and moved by sprockets 52 and a driving sprocket 53. The upper conveyor chain 51 is also retained and moved by sprockets 54 and a driving sprocket 55. The chains extend over a portion of their length parallel to the direction of movement of the veneer strips 13, whereby the lower conveyor chain 50 and the upper conveyor chain 51 form the gap 14. To ensure that the veneer strips are engaged by the conveyor chains 50 and 51, the upper conveyor chain 51 is urged by a pressure ledge 56 against the veneer strips 13. At the end of the track of the upper conveyor chain 51 in the direction of movement of the veneer strip 13, the sprocket 54 is adapted as a pressing roller and mouted on a lever system 57 which is movable by means of a pressure medium cylinder 58. In this region there is a brake shoe 59 which by means of a further pressure medium cylinder 60 may be moved towards the veneer strip so that in this manner a sudden braking of the veneer strip is possible.

For the movement of the circular segment body 16, there may be used either a common conveyor chain 22 or several conveyor chains 23, which are provided in pairs on the thread supplying and alternating devices. In this case the drive occurs via a common driving shaft 61 from which the movement is divided via bevel gears 62 to two shafts 63, which in turn via bevel gears 64 drive the conveyor chains 23. From the shafts 63 the movement may also be transmitted to pinions 25 which mesh with gear rings 21 of the circular segment bodies 16. In these described methods of drive two circular segment bodies 16 appertaining to each other are located relative to each other with a fixed gap 14. In the further method of drive via a racked bar 24 which engages in the gear ring 21, the forming of a fixed gap is not possible. In this case, of the pair of circular segment bodies 16, one will move towards the other circular segment body 16 by means of a pressure medium cylinder 65, so that the circular surface is closed. Then the movement of the circle by means of the racked bar 24 is possible. The drive of the reciprocating racked bar or chains is not shown in the drawings.

The apparatus in accordance with the invention for assembling strips of veneer operates as follows. After the ends of the upper and lower adhesive threads 37 are passed through thread guides 36 and knotted together, the first veneer strip 13 is inserted into the apparatus in the transverse direction to its course of grain by hand or mechanically. The feed units 12 convey the veneer strip 13 by means of the conveyor chains 50 and 51 through the apparatus until the leading edge of the veneer strip 13 abuts against the knotted positions of the adhesive threads 37. Continued conveying of the veneer strips 13 causes the adhesive threads 37 to be pulled out of the outlet end 42 of the thread guides 36. The adhesive of the adhesive threads 37 has been activated in the heating devices at the outlet ends 42, so that the adhering process begins. During continued conveying of the veneer strips 13, the heated adhesive threads are pressed against the surfaces of the veneer strips by the rollers 43 and 44 of the apparatus 15. The rollers 43 and 44 are thus kept clean by the sponge 49 saturated with solvent from the troughs 48. The veneer strip 13 stops immediately as its rear edge leaves the conveying region of the upper pressure roller. After the rear edge of the veneer strip 13 has cleared the light barrier of the control device in the plane in front of the rollers 43 and 44, this control device ensures the switching on of the conveyor device, for example the conveyor chain 22, engaging the circular segment bodies. This conveyor chain rotates all the thread supplying and alternating devices with the thread spools 36 and the adhesive threads 37 located therein through 180°. On completion of this movement, the feed units 12 of the feeding device are switched on again and the next veneer strip is moved towards the first veneer strip 13 still located in the device 15 by the thread supplying and alternating devices 11.

During the rotation of the thread guides 36 through 180°, the adhesive threads were caused to intersect so that the adhesive thread 37 which in the first veneer strip 13 adhered to the lower surface abuts against the upper surface in the second veneer strip 13. Accordingly, the adhesive thread 37 changes over from the upper surface of the first veneer strip 13 to the lower surface of the second veneer strip 13.

When the second veneer strip 13, during its continued movement impacts the rear edge of the first veneer strip 13, both veneer strips 13 are joined together and mutually progressively displaced until the rear edge of the second veneer strip 13 has left the pressing rollers, so that renewed rotation of the thread supplying and alternating device 11 through 180° now causes the intersection of the adhesive threads 37 behind the second veneer strip 13. In this manner it is possible to join together any number of veneer strips 13 of equal length and equal or varying widths.

I claim:

1. An apparatus for assembling strips of veneer by adhesion of adhesive threads to the upper and lower surface of said strips of veneer, comprising a veneer strip feed device and a plurality of thread supplying and alternating devices located in mutually spaced juxtaposition, each of said thread supplying and alternating devices defining a movement plane in which the veneer strips are longitudinally fed and including a pair of bodies, each body having a circular segment, said bodies being located in spaced relationship at least partially defining an adjustable passage for the veneer strips therebetween along said plane of veneer strip movement, said bodies being mounted for associated rotation about an axis of rotation which extends in the direction of and in said plane of veneer strip movement, said circular segments of each pair of bodies which define a thread supplying and alternating device being located in a plane extending substantially perpendicularly to said plane of veneer strip movement and their outer peripheries defining a circular shape, each of said thread supplying and alternating devices including a pair of elongated thread guides for guiding the adhesive threads on both sides of the veneer strips, each one of each pair of thread guides being associated with a respective one of said circular segment bodies and extending substantially in the direction of movement of the veneer strips on a respective side of said movement plane, means associated with said thread guides for heating the adhesive threads, common drive means for rotating said circular segment bodies about said axis of rotation, and means located behind each of said thread supplying and alternating devices in the direction of movement of the veneer strips for pressing the adhesive threads against the surfaces of the veneer strips, whereby said thread guides are reversibly displaceable in association with said rotatable circular segment bodies from a first position on one side of said movement plane to a second position on the other side of said movement plane thereby intersecting said movement plane during such displacement.

2. An apparatus according to claim 1, wherein said feeding device consists of a plurality of identical feeding units which are located between each two said juxtaposed thread supplying and alternating devices.

3. An apparatus according to claim 1, wherein the circular segment bodies contain a cylindrical jacket part which on its inside surface is supported by cylindrical rollers which are secured to said frame.

4. An apparatus according to claim 3, wherein the jacket part, on its outer surface, contains an annular groove in which cylindrical rollers which are secured to the frame engage.

5. An apparatus according to claim 4, wherein said driving device for said circular segment bodies contains a driven conveyor chain which engages in gear rings located on the circumference of said circular segment bodies.

6. An apparatus according to claim 5, wherein said conveyor chain is adapted to be driven by a sprocket mounted on said frame.

7. An apparatus according to claim 1, in which each said circular segment body is adapted to be driven by an individual conveyor chain which is connected to a driving shaft via bevel gears.

8. An apparatus according to claim 7, wherein each said segment body is adapted to be driven by pinions engaging in its gear ring, which pinions are connected to said driving shaft via said bevel gears.

9. An apparatus according to claim 8, wherein each said two assembled circular segment bodies are adapted to be driven by a common racked bar or chain engaging in said gear rings.

10. An apparatus according to claim 1, in which each circular segment body has an angle part mountable thereon and to which said thread guide is secured.

11. An apparatus according to claim 10, wherein said angle part contains a guide surface with curved inlet end for said strips of veneer.

12. An apparatus according to claim 11, wherein a thread spool is mountable on said angle part, the axis of the spool extending parallel to the direction of movement of said strips of veneer.

13. An apparatus according to claim 12, wherein a thread eye is secured on said angle part on the axis of said thread spool.

14. An apparatus according to claim 13, wherein said thread guide is adapted as a tube which at its outlet end or over its whole length is provided with a heating device.

* * * * *